Patented Mar. 14, 1950

2,500,145

UNITED STATES PATENT OFFICE 2,500,145

ORAL POLLEN ANTIGEN AND PROCESS OF PREPARING SAME

Edgar A. Ferguson, Jr., Brooklyn, N. Y., assignor to Van Patten Pharmaceutical Company, Chicago, Ill., a corporation of Illinois No Drawing. Application February 21, 1946, Serial No. 649,379

4 Claims. (Cl. 167—78)

This invention relates generally and broadly to the field of oral antigen therapy and is more particularly concerned with the production of a novel therapeutic material for use in the allevation of distresses such as running nose, tearing, skin itch and violent sneezing incident to acute and chronic rhinitis, sometimes known as rose-fever and more commonly known as hay-fever.

Allergic rhinitis was not recognized as a distinct entity until the nineteenth century. It had been noted by some of the early writers who mentioned that there were people with what we today call rose-fever. When first described, allergic rhinitis or hay-fever was thought to be due to the sun, and it was later attributed to the aroma from blooming grasses.

The first man to attribute hay-fever to pollen was Elliotson. From his time on, the disease was attributed to air-borne matters although some physicians would still not subscribe to the idea that pollen was the cause. These men were to some extent confused by the nature of the various types of allergies. Dust, decayed vegetable matter, wind and heat all came in for a period of blame.

It was not until Blackley conducted experiments with fresh and dried pollens from a wide variety of plants that scientific proof of the cause of hay-fever was established. Blackley made extracts of pollens for subcutaneous injections and catalogued the various pollens according to their importance in causing hay-fever.

Injection therapy has been successful in the treatment of some cases of allergic rhinitis. However, due to the increasing use of protein substances in immunization, and for the prevention of other diseases, such as diptheria and tetanus, and the use of pollen preparations themselves, there is an increasing incidence of sensitivity which interferes with the subsequent use of allergins by hypodermic injection. In certain individuals symptoms such as vomiting and syncope occur following the use of hypodermic injections of allergins and other protein-containing media.

In more recent developments antigens have been administered orally. Tuart treated hay-fever by ingestion of phenol salicylate coated tablets containing $\frac{1}{10}$ mg. of pollen protein. Those who were sensitive to grass pollen obtained relief; a small percentage obtained relief by ragweed antigen.

Black found that ragweed antigen could be found in the blood and urine after the oral ingestion of ragweed pollen abstracts. He subsequently used oral therapy in a number of sensitive patients and was successful in treating eighty per cent of these patients who were grass or ragweed sensitive. Over seventy-five per cent of the pollen-asthma oral-treated group was successfully treated.

Thommen described satisfactory results in a case with oral pollen therapy and mentions the variability of absorption by oral administration.

Urbach succeeded in alleviating symptoms of a man sensitive to the pollen of a horse-chestnut by the oral use of pollen peptides of the horse-chestnut. He also reported similar results by the use of peptides made from the entire pollenating flowers.

In 1933 Catterdam reported on oral pollen therapy wherein a series of 85 hay-fever patients were treated with pollen orally. Eighty per cent were markedly relieved.

Burnstein and Kirsner showed that peptic digestion of ragweed pollen (either whole or as an extract) does not destroy its activity. This is an important advance in the art since it established that pollen may be given by the mouth without descrtuction by the gastric juices.

Stier and Hollister observed 383 cases over a period of three years and found that oral administration of pollen extracts gave about the same results as the hypodermic method. They emphasized ease of administration and wider margin of safety.

The serious disadvantage attending the use of raw pollen, whether administered hypodermically or orally, is the almost invariable production of undesirable side reactions resulting in gastrointestinal irritation, such as vomiting, diarrhea, and loss of appetite, as well as urticaria, increase of skin itch, and increase in injection of the conjuctiva. If one attempts to reduce the dose of raw pollen to below a point where gastrointestinal irritation occurs, the dosage level is below the effective level during certain days in the areas of high pollen count. Furthermore, where a patient is effected with severe heart lesions, rheumatic heart disease, or other disabling diseases, there has been a reluctance on the part of physicians to administer allergins hypodermically or orally in large doses when raw untreated pollen is used.

It has now been found, in accordance with the present invention, that various pollens causing allergic rhinitis may be administered orally with highly satisfactory results and without the foregoing difficulties incident to their being injected hypodermically or when given orally in the raw state, provided that these raw pollens are first hydrolyzed. In fact, it has been definitely established that hydrolysis so effectively treats the pollen that in a series of 250 sensitive patients doses as high as 150 mgs. (150,000 micrograms) have not produced symptoms of gastrointestinal upset in any case.

Hydrolysis of the raw pollen may be effected either by mild alkalis or mild acids, although, in the preferred embodiment of the invention, the raw pollen is first subjected to a mild alkaline hydrolysis and then to a mild acid hydrolysis.

While the invention is in no way restricted with respect to possible reactions taking place when the raw pollens are hydrolyzed, the following may be given by way of explanation:

Allergy-producing protein fractions have been separated from such products as ragweed pollen which is the main offender in the United States, causing loss of time from work and discomfort to many due to the allergic rhinitis it produces.

The main allergy-producing fraction from ragweed contains a pentose, a flavonol pigment and two polypeptide molecules.

The molecular weight of the major antigen is 4496 as determined by its empirical formula and by its sulfur and carbohydrate content.

It contains 11.85% nitrogen, 3.33% pentose and is a complete molecule. Each molecule contains one molecule of the flavonol-pigment (isorhamnetin), one molecule of pentose (arabinose) and two polypeptide molecules. The two polypeptide molecules contain an aggregate of 28 amino acids and an unusually large percentage of dicarboxylic-amino acids.

In addition to this large molecular weight antigen, three other active antigens have been separated.

The second fraction is a quercetin-dextrose-hexapeptide complex with a molecular weight of 1168. The hexapeptide consists of mono amino acids.

Fraction 3 is an isorhamnetin-rhamnose-tripeptide complex with a molecular weight of 951.

Fraction 4 is an isorhamnetic-rhamnose-tetrapeptide complex with a molecular weight of 1117.

All these fractions are immunologically and biologically active.

The process of alkaline and acid hydrolysis tends to separate these fractions from the molecule. In a manner analogous to the separation of the cardiac glucosides of digitalis into glucose and digitoxigenin when it undergoes hydrolysis, these compounds tend to separate to an extent determined by the degree of hydrolysis from their carbohydrate components. Mild acid and mild alkaline hydrolysis must be used in order to prevent complete disruption of the allergins.

The fractions are probably broken down as follows:

*Ragweed*

1. Main allergy producing fraction $\xrightarrow{\text{Hydrolysis}}$ Pentose + Isorhamnetin (Arabinose) 2 polypeptides 2. 2nd allergy producing fraction $\xrightarrow{\text{Hydrolysis}}$ Dextrose + Quercetin hexapeptide 3. 3rd allergy producing fraction $\xrightarrow{\text{Hydrolysis}}$ Rhamnose + Isorhamnetin tetrapeptide In practicing the present invention and in the hydrolysis of raw pollen, the following procedure is employed:

Clean, dry pollens which have been kept in cool, dry storage are mixed in the following proportions:

Mixed giant and short ragweed 1000 gms. (*Ambrosia trifida* and *A. elatior*).

Orchard grass 100 gms. (*Dact. glomer.*). Timothy 100 gms. (*Phleum pratense*). Goldenrod 10 gms. (*Solidago*). Pin oak 20 gms. (*Quercus polustris*).

Rye 10 gms. (*Secale cereale*).

It is also desirable to include one pollen of the Chenopodium group such as Botrys (Jerusalem oak, approximately 1 gm.), Amaranthus such as Spinosus (Spiny Amaranthus, approximately 1 gm.), Artemisia such as Annua (Annual Wormwood, approximately 1 gm.), Aster (cultivated, approximately 1 gm.), Rye-grass (Perennial-Lolium perenne, approximately 1 gm.) and Ailanthus (tree of heaven, approximately 1 gm.).

To this mixture are added 4,000 cc. distilled water, 20 cc. U. S. P. cresol, and 4 gms. of C. P. sodium hydroxide (previously dissolved in 100 gms. of water). The resulting mixture is heated for two hours at 50° C., after which time 1,000 cc. of ethyl alcohol is added. For this purpose, there is employed S. D. #1 or #3A or any ethyl alcohol which has been denatured with methyl alcohol and/or a small amount of completely volatile heterocyclic benzene derivative which has a non-toxic residue. After adding 6.2 cc. of 36 normal C. P. sulphuric acid, the mixture is allowed to stand at room temperature for one hour. After standing for this period of time, 800 cc. of alcohol and an additional 3 cc. of 36 normal C. P. sulphuric acid is added, and the resulting mixture is heated for two hours at 50° C.

The material is then placed in a large vat with a condensing hood where the alcohol and water are distilled off at a temperature not in excess of 40° C. Low pressure may be used to hasten evaporation. When the mixture becomes a heavy sludge, it is removed from the vat and spread out in flat pans to dry under the influence of infra-red driers. A 1000-watt infra-red unit within a 2-foot parabolic aluminum reflector at a distance of 3 feet will cover a pan of approximately 1 yard square area. The unit may be left on until the pollen is completely dry.

As an alternate method drying may sometimes be hastened by allowing the mixture to settle and decanting the fluid. This fluid is then evaporated in an ordinary alcohol still at 80° C. When a sludge is formed, this is dried separately and it is later added to the bulk of the dried treated pollen by any method which will insure uniform mixture.

4000 gms. of rose leaves are added to the dried treated pollen. These rose leaves should be reduced to a fine powder and ground in a ball mill until a flour-like consistency is obtained. The rose leaves and pollen are mixed together to insure uniform mixture. The best rose leaves for this preparation are pale buds which are supplied by pharmaceutical jobbers under the title "Pale rose leaves." The cortex and stems are not removed before grinding.

It is obvious that one may use any mineral acid for the achievement of a satisfactory low pH during the process of acid hydrolysis. Likewise organic acids such as acetic acid may be used, but a much greater quantity is necessary than is indicated by the pH. There is consequent difficulty in handling the problem of neutralization with the consequent accumulation of salts in the mixture.

It is likewise obvious that other alkalis may be used except that it is desirable to avoid the formation of salts other than small amounts of sodium sulphate or sodium chloride. Carbonates and borates are especially to be avoided due to possible gastric irritation from this source. It is also obvious that it makes no difference whether acid or alkali hydrolysis is the first or second part of the process.

It is to be understood, furthermore, that any of the pollens causing hay-fever could be hydrolyzed and employed as such, although a combination of two or more pollens is more universally adaptable.

The hydrolyzed raw pollen may be put up in the form of tablets, pills, capsules, perles and the like, and they may be enteric coated but this has been found to be unnecessary.

One method of preparing tablets is as follows: A weighed amount of the pollen representing 1 gm. of treated mixed ragweed and common pollens is placed in a glass mortar with 4 gms. powdered rose leaves and triturated with 2 gms. of lactose (U. S. P.) and .5 gm. of the best grade acacia until a homogeneous powder is formed. This material may be screened through a silk sieve and granulated with three drops of distilled water. The granulated material is dried and .25 gm. of cornstarch and .25 gm. of talc is added. The resultant mixture may be compressed into a number of tablets of such weight that each will represent 10,000 micrograms of treated pollens.

The 10,000 microgram tablet may be taken as a test dose. If no untoward symptoms develop, the dose may be increased daily by one tablet per day to a maximum of ten, or until relief is obtained from the symptoms of allergic rhinitis. The usual dose is two tablets three times per day.

What is claimed is:

1. A process for producing a therapeutic agent for oral administration in the alleviation of hay-fever distresses without causing gastrointestinal upset which comprises subjecting hay-fever-causing pollen to a mild alkaline hydrolysis by treating it with a 0.1% aqueous solution of an alkali for about two hours at about 50° C., neutralizing with an acid, subjecting the thus treated pollen to a mild acid hydrolysis by treating it with a 0.05% aqueous solution of an acid for about two hours at about 50° C. and then drying and recovering the treated pollen.

2. A process for producing a therapeutic agent for oral administration in the alleviation of hay-fever distresses without causing gastrointestinal upset which comprises subjecting hay-fever-causing pollen to a mild acid hydrolysis by treating it with a 0.05% aqueous solution of an acid for about two hours at about 50° C., neutralizing with an alkali, subjecting the thus treated pollen to a mild alkaline hydrolysis by treating it with a 0.1% aqueous solution of an alkali for about two hours at about 50° C. and then drying and recovering the treated pollen.

3. A therapeutic agent for oral administration in the alleviation of hay-fever distresses without causing gastrointestinal upset comprising hay-fever-causing pollen which has been subjected to the double hydrolysis process set forth in claim 1.

4. A therapeutic agent for oral administration in the alleviation of hay-fever distresses without causing gastrointestinal upset comprising hay-fever-causing pollen which has been subjected to the double hydrolysis process set forth claim 2.

EDGAR A. FERGUSON, Jr.

REFERENCES CITED

The following references are of record in the file of this patent:

UNITED STATES PATENTS

| Number | Name | Date |
|---|---|---|
| 2,207,415 | Rosenwald | July 9, 1940 |
| 2,321,043 | Rockwell | June 8, 1943 |
| 2,347,435 | Rockwell | Apr. 25, 1944 |

FOREIGN PATENTS

| Number | Country | Date |
|---|---|---|
| 453,159 | Great Britain | Sept. 7, 1936 |

OTHER REFERENCES

Hopkins, "Production of Protein Allergen Solutions" in Mfg. Chemist and Mfg. Perfumer, April 1943, pages 105,106.

Feinberg et al., "Oral Pollen Therapy in Ragweed Pollinosis" in Journal American Medical Association July 6, 1940, pages 23–29.